United States Patent [19]

Suzuki et al.

[11] Patent Number: 5,758,621
[45] Date of Patent: Jun. 2, 1998

[54] SUCTION AIR CONTROL APPARATUS OF INTERNAL COMBUSTION ENGINE

[75] Inventors: Norio Suzuki; Kota Ikefuchi, both of Wako, Japan

[73] Assignee: Honda Giken Kogyo Kabushiki Kaisha, Tokyo, Japan

[21] Appl. No.: 794,737

[22] Filed: Feb. 3, 1997

[30] Foreign Application Priority Data

Feb. 5, 1996 [JP] Japan .................................. 8-040301

[51] Int. Cl.$^6$ ...................................................... F02D 7/00
[52] U.S. Cl. ........................................................ 123/399
[58] Field of Search ................................ 123/399, 339.15, 123/361, 403, 406, 415, 416, 421

[56] References Cited

U.S. PATENT DOCUMENTS

| 5,606,951 | 3/1997 | Southern et al. | 123/399 |
| 5,619,967 | 4/1997 | Streib | 123/399 |
| 5,622,151 | 4/1997 | Lang | 123/339.15 |
| 5,645,033 | 7/1997 | Person et al. | 123/399 |

FOREIGN PATENT DOCUMENTS 8-49586  2/1996  Japan .

*Primary Examiner*—Raymond A. Nelli
*Attorney, Agent, or Firm*—Armstrong, Westerman, Hattori, McLeland & Naughton

[57] ABSTRACT

A suction air control apparatus of an internal combustion engine in which amount of the suction air is presumed to prevent occurrence of overshoot and realize a smooth running is provided. The apparatus comprises throttle opening degree control means for driving a throttle valve provided in a suction system to control throttle opening degree to a target throttle opening degree set in accordance with an operation state for regulating amount of the suction air; suction air amount presumption means for presuming an amount of the suction air corresponding to a target throttle opening degree of the throttle opening degree control means based on an operation state; suction air amount rapid increase judgment means for judging rapid increase of the suction air amount from fluctuation of the suction air amount presumed by the suction air amount presumption means; and target throttle opening degree correction means for restrictively correcting the target throttle opening degree when the suction air amount rapid increase judgment means judges rapid increase of the suction air amount.

6 Claims, 4 Drawing Sheets

SUCTION AIR CONTROL APPARATUS OF INTERNAL COMBUSTION ENGINE

BACKGROUND OF THE INVENTION

The present invention relates to a suction air control apparatus for driving and controlling a throttle valve provided in a suction system of an internal combustion engine to regulate amount of the suction air.

In an internal combustion engine, when a throttle valve is driven to open rapidly, suction air flows in one breath owing to pressure difference between front and rear of the throttle valve and an overshoot is generated to increase output torque of the internal combustion engine rapidly and accelerate the vehicle. Then, amount of the suction air comes into a saturated state and the output torque lowers to decelerate the vehicle. However, since the acceleration and deceleration take place in a short time, running of the vehicle becomes jerky.

Accordingly, a mechanical constitution that an eccentric throttle drum is interposed between an accelerator pedal and an throttle valve to modify amount of pressing down of the accelerator pedal so as to obtain a necessary throttle characteristic by the eccentric throttle drum has been proposed. But the throttle characteristic is decided by the shape of the eccentric throttle drum definitely.

Further, in a system for driving a throttle valve through a motor controlled by a computer, there is an example in which amount of variation of a target throttle opening degree indicating a target for driving the throttle valve is observed to give the amount of variation a certain limitation when the amount of variation is large (Japanese Laid-Open Patent Publication No. Hei 8-49586 (1996)).

However, if the throttle characteristic is decided definitely as in the former case, fear of the overshoot remains still because amount of suction air is not determined definitely.

Also in the latter case, amount of suction air cannot be predicted easily only by observation of the target throttle opening degree because there are other factors such as suction pressure and the like, and it is difficult to anticipate occurrence of the overshoot.

Therefore, hitherto it was difficult to previously prevent the jerky vehicle running owing to the overshoot when the throttle valve is opened rapidly.

SUMMARY OF THE INVENTION

The present invention has been accomplished in view of the foregoing and an object of the invention is to provide a suction air control apparatus of an internal combustion engine which presume amount of suction air to prevent occurrence of the overshoot and realize a smooth running of a vehicle.

In order to attain the above object, the present invention provides a suction air control apparatus of an internal combustion engine, comprising throttle opening degree control means for driving a throttle valve provided in a suction system to control throttle opening degree to a target throttle opening degree set in accordance with an operation state for regulating amount of the suction air; suction air amount presumption means for presuming an amount of suction air corresponding to a target throttle opening degree of the throttle opening degree control means based on a operation state; suction air amount rapid increase judgment means for judging rapid increase of the suction air amount from fluctuation of the suction air amount presumed by the suction air amount presumption means; and target throttle opening degree correction means for restrictively correcting the target throttle opening degree when the suction air amount rapid increase judgment means judges rapid increase of the suction air amount.

According to the present invention, since a suction air amount corresponding to a target throttle opening degree is presumed based on an operation state and rapid increase of the presumed suction air amount is judged, occurrence of the overshoot can be predicted almost surely, therefore by restrictively correcting the target throttle opening degree to suppress the suction air amount suitably, occurrence of the overshoot can be prevented to allow a smooth operation of the internal combustion engine and a jerky running on acceleration can be avoided.

The suction air control apparatus may comprise throttle driving speed correction means for correcting driven speed of the throttle valve when the suction air amount rapid increase judgment means judges rapid increase of the suction air amount. The suction air amount can be suppressed more suitably to allow a smoother operation of the internal combustion engine.

The suction air amount rapid increase judgment means may judge the rapid increase of the suction air amount based on a ratio of a present value and a primary delay value of the suction air amount presumed by the suction air amount presumption means. Rapid increase of amount of suction air passing through the throttle in a transitional state can be judged easily to predict and prevent occurrence of the overshoot.

The suction air amount rapid increase judgment means may judge the rapid increase of the suction air amount based on a ratio of a present value and a primary delay value of the suction air amount presumed by the suction air amount presumption means and a gear ratio of a change gear or a driving torque. Rapid increase of the suction air amount can be judged more exactly in view of the operation state to prevent the overshoot surely.

DETAILED DESCRIPTION OF THE PREFERRED EMBODIMENT

Figure 1:
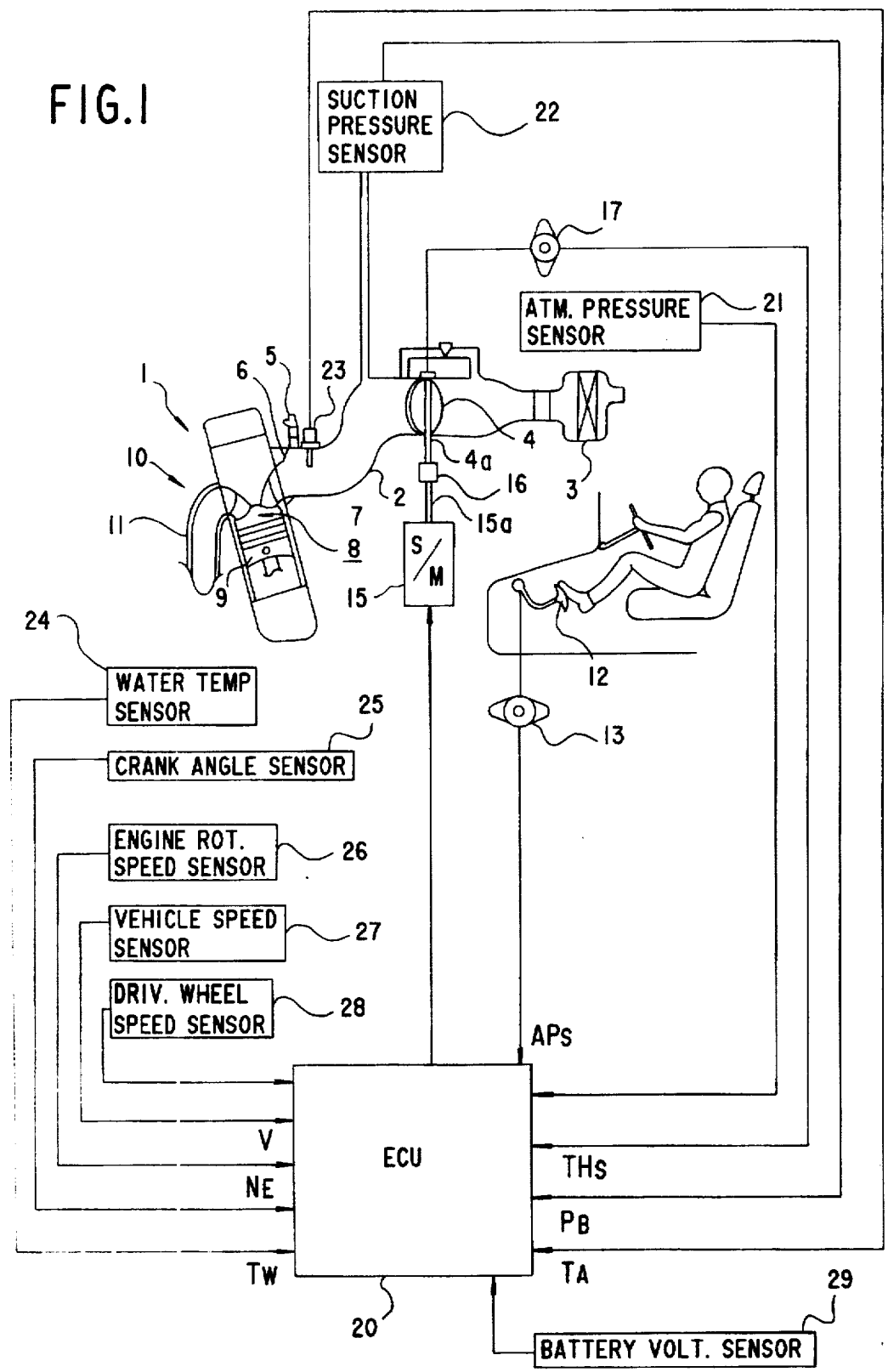
FIG. 1 is a rough view showing an entire fuel supply control apparatus of an internal combustion engine according to one embodiment of the present invention.

Hereinafter, an embodiment of the present invention will be described with reference to FIGS. 1 to 6. In this embodiment, the present invention is applied to an internal combustion engine to be mounted in a vehicle and FIG. 1 is a rough view showing an entire fuel supply control apparatus of the internal combustion engine.

An intake passage 2 for supplying fuel to the internal combustion engine 1 is provided with an air cleaner 3 at an upper stream end, a throttle valve 4 for opening and closing the intake passage 2 at a middle way and a fuel injection valve 5 on a lower stream side. Air introduced in the intake passage 2 through the air cleaner 3 is regulated with respect to the flow rate by the throttle valve 4, enters an intake manifold 6 and then flows into a combustion chamber 8 together with fuel injected from the fuel injection valve 5 through an intake port opened and closed by an intake valve 7.

The mixture thus introduced in the combustion chamber burns to drive a piston 9, then discharges out of the engine through an exhaust port opened and closed by an exhaust valve 10, an exhaust manifold 11 and an exhaust passage.

On a floor of a driving room of a vehicle having the internal combustion engine 1 mounted is arranged an accelerator pedal 12 which is forced to an idle position by a spring and rocks in accordance with a pressing down motion of a driver.

As shown in FIG. 1, the accelerator pedal 12 and the throttle valve 4 are not connected mechanically with each other. The pressed amount of the accelerator pedal 12 is detected by an accelerator sensor 13 composed of a potentiometer provided on a rocking shaft of the accelerator pedal 12, the throttle valve 4 is driven to open and close by a step motor 15, and the step motor 15 is operated by a driving signal from an electronic control unit ECU 20.

A driving shaft 15a of the step motor 15 and a valve shaft 4a of the throttle valve 4 are coaxial and directly connected with each other through a connecting portion 16 without any variable-speed connecting device such as a gear. An angle of rotation in normal or reverse direction of the step motor 15 is nothing but an angle of opening or closing of the throttle valve 4. The opening or closing angle of the throttle valve 4 is detected by a throttle sensor 17 and the detection signal is inputted to ECU 20.

An atmospheric pressure sensor 21 is arranged on the upper stream side of the intake passage 2, a suction pressure sensor 22 is provided on the lower stream side of the throttle valve 4 to detect an absolute pressure of the suction air, and on further lower stream side is provided a suction air temperature sensor 23 for detecting a temperature of the suction air.

In the neighborhood of the combustion chamber 8 of the internal combustion engine 1 is provided a water temperature sensor 24 for detecting a temperature of the cooling water, and within a distributor is provided a crank angle sensor 25. In addition, an engine rotational speed sensor 26, a vehicle speed sensor 27 and a driving wheel speed sensor 28 are provided on suitable positions. Detection signals of the above sensors are inputted to ECU 20.

Other detection signals from various sensors such as a battery voltage sensor 29 for detecting a battery voltage are also inputted to ECU 20. The step motor 15 is a hybrid type 4 phases stepping motor and driven by phase exciting drive mode.

Figure 2:
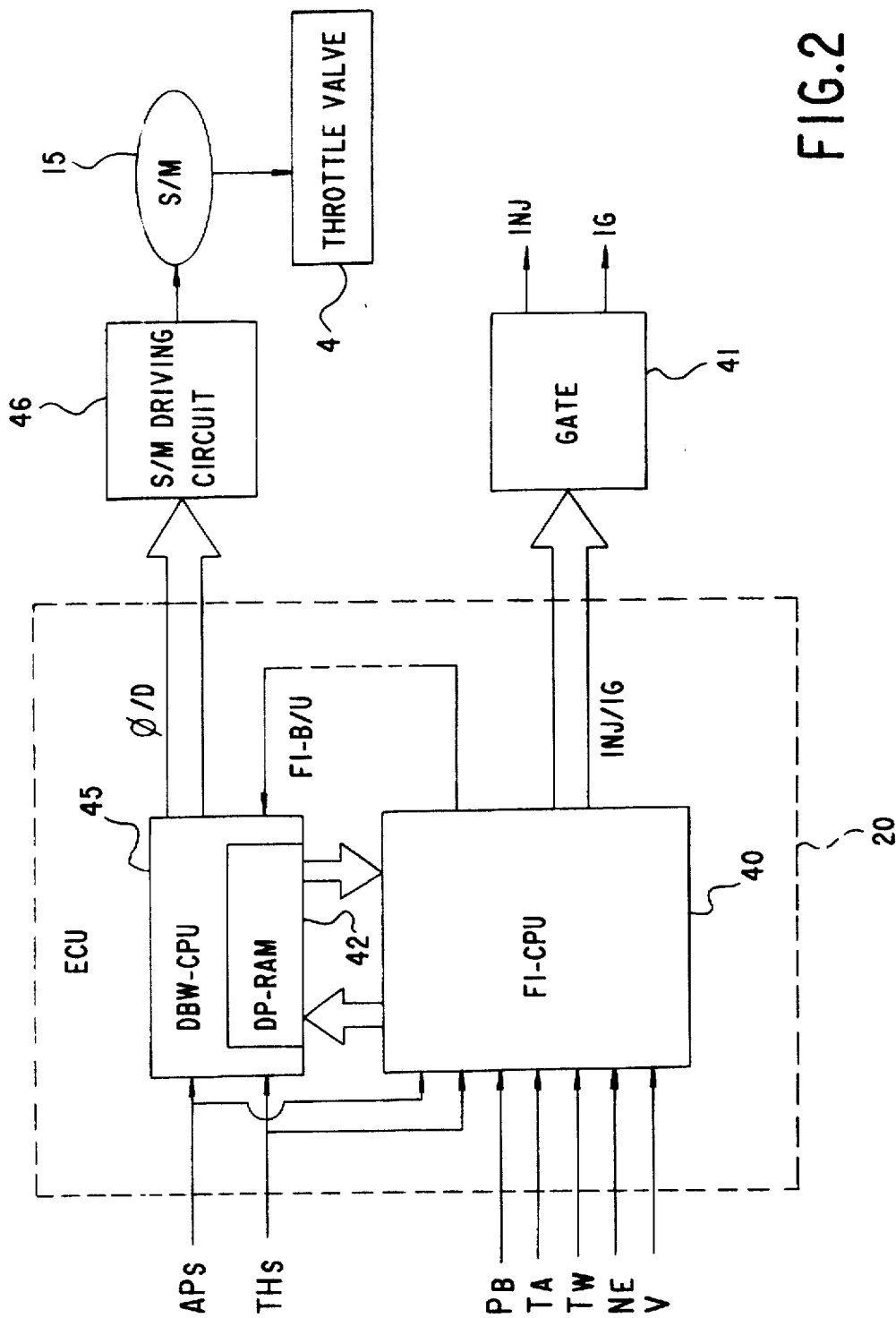
FIG. 2 is a rough block diagram showing a control system of the fuel supply control apparatus.

FIG. 2 is a rough block diagram showing the control system. Within the ECU 20, the fuel supply control is carried out by FI-CPU 40 which is inputted with detection signals from the above-mentioned various sensors detecting operation states of the internal combustion engine such as intake pipe absolute pressure $P_B$, suction air temperature $T_A$, engine cooling water temperature $T_W$, engine rotational speed $N_E$, vehicle speed V, accelerator pedal angle $AP_S$, from the accelerator sensor 13, and throttle valve opening degree $TH_S$ from the throttle sensor 17 for example, and outputs INJ signal for controlling the fuel injection valve 5 based on the operation state and IG signal for controlling the ignition time through a gate 41.

The opening degree control of the throttle valve 4 by the step motor 15 is carried out through DBW-CPU 45. The acceleration pedal angle signal $AP_S$ and the throttle valve opening degree signal $TH_S$, detected by the accelerator sensor 13 and the throttle sensor 17 respectively are inputted into the DBW-CPU 45, an exciting phase signal $\phi$ and a duty signal D for driving the step motor 15 is outputted from the DBW-CPU 45 to a step motor drive circuit 46, and the step motor 15 is driven by the step motor drive circuit 46.

The detection signals of the accelerator sensor 13 and the throttle sensor 17 are also inputted to FI-CPU 40 in addition to the signals from sensors detecting states of operation to calculate a target throttle opening degree based on the detection signals. These informations are transmitted to DBW-CPU 45 through DP-RAM 42 which manages give-and-take of signals between FI-CPU 40 and DBW-CPU 45.

DBW-CPU 45 determines a final target throttle opening degree $TH_O$ on the basis of these informations through various corrections on the way, and sets and outputs the above-mentioned exciting phase $\phi$ and duty D of the electric current supplied to the step motor 15 to make the throttle opening degree of the throttle valve 4 coincide with the final target throttle opening degree $TH_O$.

In case of some operation states or abnormal states, FI-CPU 40 can perform a role of back up intervening in DP-RAM 42. At this time, transmitting and receiving of signals by DP-RAM 42 are stopped.

Figure 3:
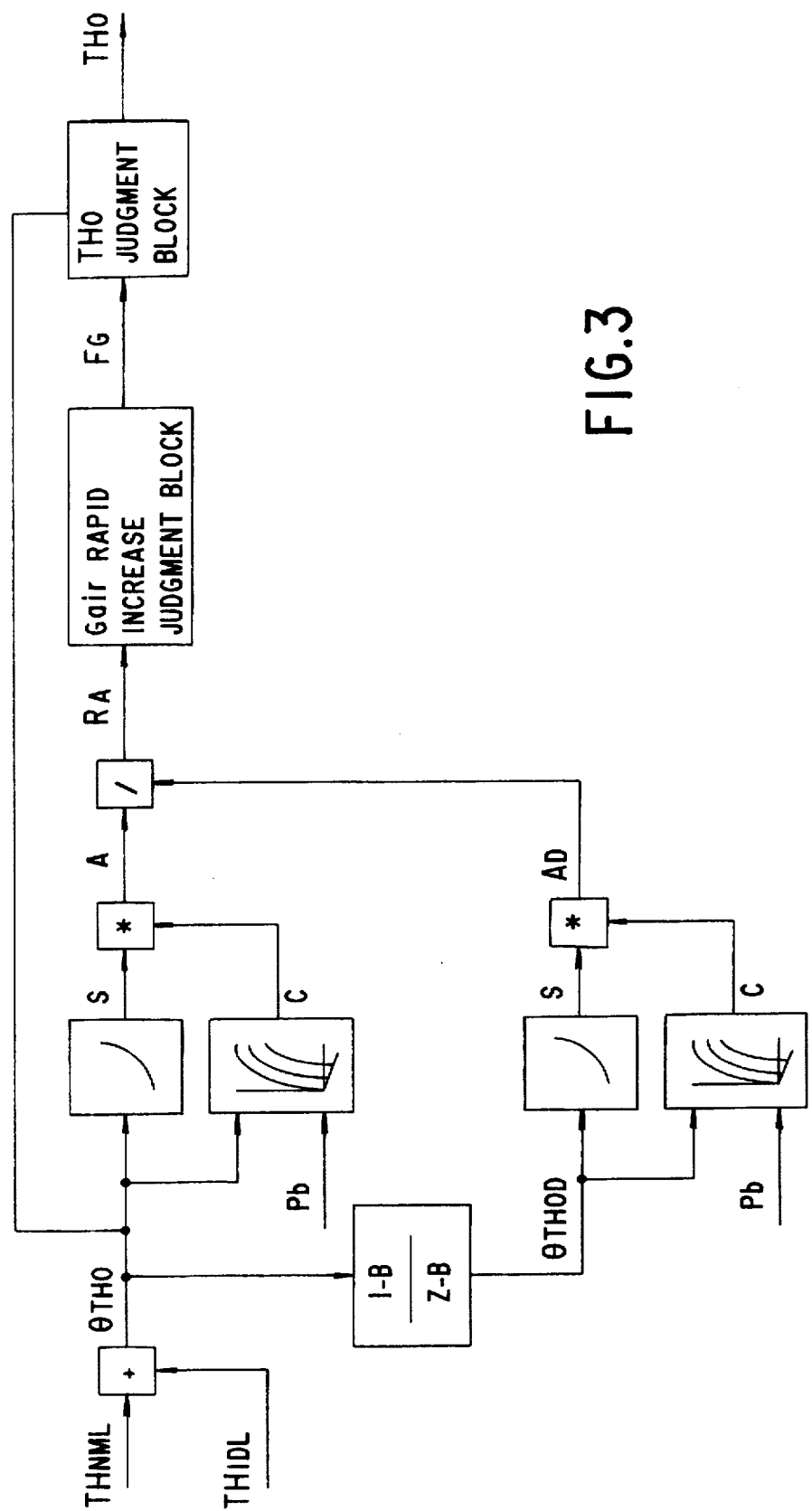
FIG. 3 is a functional block diagram showing a process of calculating a final target throttle opening degree $TH_O$ by the control system.
Figure 4:
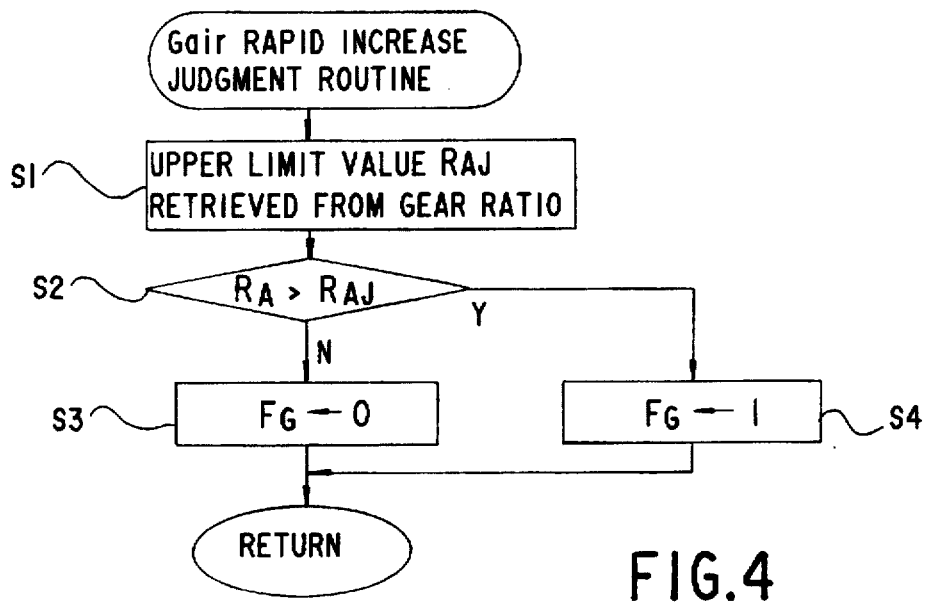
FIG. 4 is a flow chart showing a procedure of $G_{air}$ rapid increase judgment.

FIG. 3 is a functional block diagram showing a process of calculating a final target throttle opening degree $TH_O$ on the basis of the above control system block diagram.

At first, a first target throttle opening degree $\theta_{THO}$ is calculated by adding the idle throttle opening degree $TH_{IDL}$ to the fundamental target throttle opening degree $TH_{NML}$ which is calculated mainly from the accelerator pedal angle $AP_S$ detected by the accelerator sensor 13.

The fundamental target throttle opening degree $TH_{NML}$ is decided based on mainly the accelerator pedal angle $AP_S$ in view of the idle throttle opening degree $TH_{IDL}$ and obtained by retrieving a map set beforehand.

Next, a projected area S of the throttle is obtained from the first target throttle opening degree $\theta_{THO}$ in accordance with a characteristic set beforehand, a coefficient C (the product of a flow rate coefficient a and an expansion correction coefficient $\epsilon$ of gas) is obtained in accordance with another characteristic set beforehand with respect to the first target throttle opening degree $\theta_{THO}$ and the suction pressure Pb, and then an effective opening area A(=C×S) is obtained by multiplying the area S by the coefficient C.

The throttle effective opening area A is proportional to a throttle passing air amount $G_{TH}$ as expressed by the following formula.

$$G_{TH} = a \times \rho_1 \times [2g(Pa-Pb)/\gamma_1]^{1/2}$$

$\rho_1$: air density at upper stream side
g : acceleration of gravity
Pa : atmospheric pressure
Pb : suction pressure
$\gamma_1$: air specific weight (=$\rho_1 \times$g) at upper stream side The effective opening area is considered to vary nearly in accordance with change of the throttle opening degree, and a primary delay value $\theta_{THOD}$ of the above target throttle opening degree $\theta_{THO}$ should correspond to a primary delay of the effective opening area nearly equivalently phenomenally.

Therefore, a primary delay value $A_D$ of the effective opening area is calculated from the primary delay value $\theta_{THOD}$ of the first target throttle opening degree $\theta_{THO}$ in the same manner as the foregoing. In FIG. 3, (1-B)/(Z-B) is a transfer function of a discrete system and means the primary delay.

Variation of the suction air amount $G_{air}$ in the transitional operation state is expressed by a ratio $R_A$ of the present value A of the throttle effective opening area and its primary delay value $A_D$ ($R_A = A/A_D$). The ratio $R_A$ corresponds to the ratio of a present value of the suction air amount and the primary delay value of the suction air amount. Accordingly, rapid increase of the suction air amount $G_{air}$ is judged on the basis of the ratio $R_A$. The rapid increase is judged in the $G_{air}$ rapid increase judgment block according to the following procedure shown in FIG. 4.

At first, an upper limit value $R_{AJ}$ of the ratio $R_A$ is retrieved from a map set beforehand, on the basis of a gear ratio of the change gear at a present state of operation (Step 1).

Figure 5:
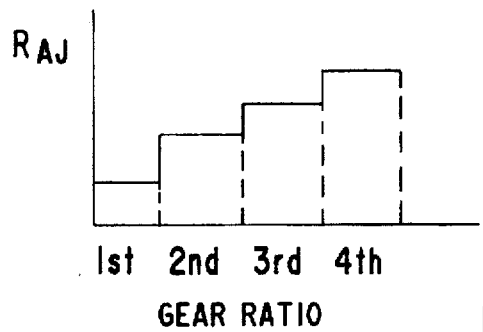
FIG. 5 is a graph showing upper limit values $R_{AJ}$ of a ratio $R_A$ with respect to gear ratios of a change gear.

As shown in FIG. 5 which is a graph for expressing the map, the upper limit value $R_{AJ}$ increases stepwise as the gear ratio changes in order of 1st, 2nd, 3rd and 4th.

In the next step 2, whether the calculated ratio $R_A$ exceeds the retrieved upper limit value $R_{AJ}$ or not is discriminated. When the ratio $R_A$ is smaller than the upper limit value $R_{AJ}$, the flow advances to Step 3 where a rapid increase flag $F_G$ is set to "0". When the ratio $R_A$ exceeds the upper limit value $R_{AJ}$, the flow jumps to Step 4 where the rapid increase flag is set to "1".

Figure 6:
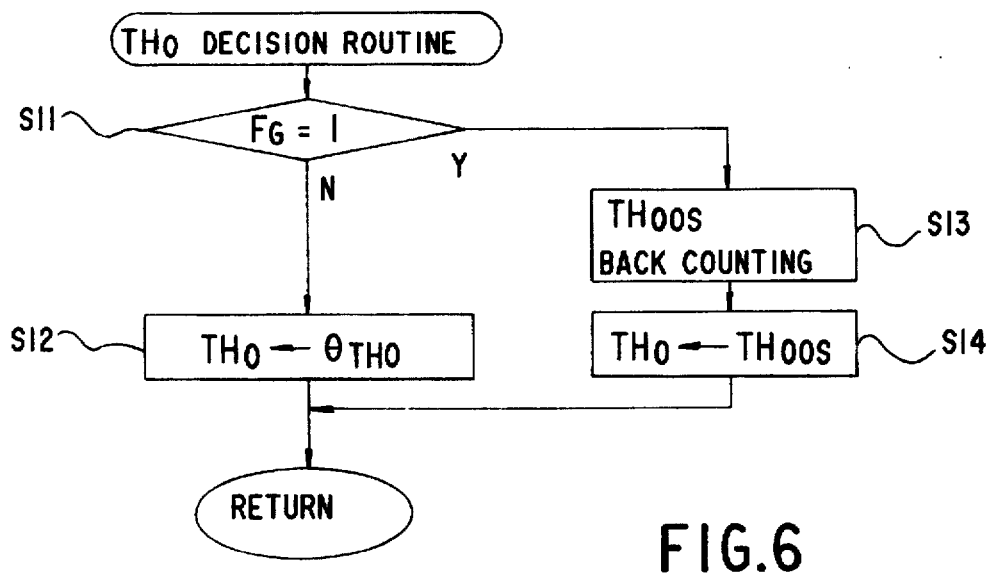
FIG. 6 is a flow chart showing a procedure of deciding the final target throttle opening degree $TH_O$.

After the rapid increase judgment of the suction air amount $G_{air}$ in the "$G_{air}$ rapid increase judgment block" is ended, a final target throttle opening degree $TH_O$ is decided in a "$TH_O$ judgment block" (FIG. 3). FIG. 6 is a flow chart showing a procedure of deciding the final target throttle opening degree $TH_O$.

Firstly, whether the rapid increase flag $F_G$ is set to "1" or not is discriminated.

When the flag $F_G$ is set to "0", the flow advances to Step 12 where the final target throttle opening degree $TH_O$ is represented by the first target throttle opening degree $\theta_{THO}$ to regard the first target throttle opening degree $\theta_{THO}$ by itself as the final target throttle opening degree $TH_O$.

On the other hand, when the ratio $R_A$ exceeds the upper limit value $R_{AJ}$ and the flag $F_G$ is set to "1", the flow jumps to Step 13 to obtain a target throttle opening degree $TH_{OOS}$ in which the ratio $R_A$ is equal to the upper limit value $R_{AJ}$ by back counting. Then, in the next step 14, the final target throttle opening degree $TH_O$ is represented by the target throttle opening degree $TH_{OOS}$ obtained by the back counting.

As described above, when the ratio $R_A$ exceeds the upper limit value $R_{AJ}$ and rapid increase of the suction air amount $G_{air}$ is expected, the final target throttle opening degree $TH_O$ is restrictively set to the target throttle opening degree $TH_{OOS}$ in which the ratio $R_A$ is equal to the upper limit value $R_{AJ}$. accordingly, the suction air amount can be suppressed suitably, occurrence of the overshooting can be prevented and a smooth operation of the internal combustion engine is obtainable.

Further, since the upper limit value $R_{AJ}$ is restricted in a smaller value as the gear ratio is smaller, the jerky running on acceleration can be avoided more effectively.

In the above-mentioned embodiment, when rapid increase of the suction air amount $G_{air}$ is expected, the value of the final target throttle opening degree $TH_O$ is set to a restricted value, however, speed of the throttle valve driven to attain the final target throttle opening degree $TH_O$ also may be controlled to be restricted.

In the suction air amount rapid increase judgment of the above-mentioned embodiment, the upper limit value $R_{AJ}$ of the ratio $R_A$ is retrieved and decided based on the gear ratio, however, it may be decided based on a torque of a driving wheel.

That is, the upper limit value $R_{AJ}$ is set to a smaller value as the driving wheel torque is larger.

The driving wheel torque can be obtained by multiplying an engine torque, which is introduced from the engine rotational speed Ne, the suction pressure Pb and the like, by a gear ratio and a transfer efficiency.

What is claimed is:

1. A suction air control apparatus of an internal combustion engine, comprising:

throttle opening degree control means or driving a throttle valve provided in a suction system to control throttle opening degree to a target throttle opening degree set in accordance with an operation state for regulating amount of the suction air;

suction air amount calculating means for presuming= calculating an amount of the suction air corresponding to a target throttle opening degree of said throttle opening degree control means based on an operation state;

suction air amount rapid increase determination means for determining rapid increase of the suction air amount from fluctuation of the suction air amount calculated by said suction air amount calculation means; and target throttle opening degree correction means for restrictively correcting said target throttle opening degree when said suction air amount rapid increase determination means determines rapid increase of the suction air amount.

2. A suction air control apparatus of an internal combustion engine claimed in claim 1, comprising throttle driving speed correction means for correcting driven speed of the throttle valve when said suction air amount rapid increase determination means determines rapid increase of the suction air amount.

3. A suction air control apparatus of an internal combustion engine claimed in claim 1 or 2, wherein said suction air amount rapid increase determination means determines the rapid increase of the suction air amount based on a ratio of a present value and a primary delay value of the suction air amount calculated by said suction air amount calculation means.

4. A suction air control apparatus of an internal combustion engine claimed in claim 1 or 2, wherein said suction air amount rapid increase determination means determines the rapid increase of the suction air amount based on a ratio of a present value and a primary delay value of the suction air amount calculated by said suction air amount calculation means and a gear ratio of a change gear of driving with torque.

5. A suction air control apparatus of an internal combustion engine claimed in claim 2, wherein said suction air amount rapid increase judgment means judges the rapid increase of the suction air amount based on a ratio of a present value and a primary delay value of the suction air amount presumed by said suction air amount presumption means.

6. A suction air control apparatus of an internal combustion engine claimed in claim 2, wherein said suction air amount rapid increase judgement means judges the rapid increase of the suction air amount based on a ratio of a present value and a primary delay value of the suction air amount presumed by said suction air amount presumption means and a gear ratio of a change gear or driving torque.

* * * * *